(12) United States Patent
Robertson

(10) Patent No.: US 7,082,826 B2
(45) Date of Patent: Aug. 1, 2006

(54) GAS FLOW METER AND METHOD FOR MEASURING GAS FLOW RATE

(75) Inventor: Eric P. Robertson, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 42 days.

(21) Appl. No.: 10/966,632

(22) Filed: Oct. 14, 2004

(65) Prior Publication Data

US 2006/0081045 A1   Apr. 20, 2006

(51) Int. Cl.
*G01F 3/28* (2006.01)
(52) U.S. Cl. ............................................... 73/220
(58) Field of Classification Search ................. 73/220, 73/861.63, 861.52, 861.32, 168; 374/36
See application file for complete search history.

(56) References Cited

U.S. PATENT DOCUMENTS

| | | | |
|---|---|---|---|
| 4,515,012 A * | 5/1985 | Jenkins et al. ................ 73/168 |
| 4,519,387 A * | 5/1985 | Durkan et al. ......... 128/204.23 |
| 5,201,581 A * | 4/1993 | Vander Heyden et al. .... 374/36 |
| 5,551,282 A | 9/1996 | Vander Heyden |
| 5,684,245 A | 11/1997 | Hinkle |
| 5,925,829 A | 7/1999 | Laragione et al. |
| 5,975,126 A | 11/1999 | Bump et al. |
| 6,502,467 B1 * | 1/2003 | Fincke ..................... 73/861.63 |
| 6,564,825 B1 | 5/2003 | Lowery et al. |
| 6,725,731 B1 * | 4/2004 | Wiklund et al. ......... 73/861.52 |
| 6,739,204 B1 * | 5/2004 | Barefoot ................... 73/861.32 |

* cited by examiner

Primary Examiner—Jewel V. Thompson
(74) Attorney, Agent, or Firm—TraskBritt, P.C.

(57) ABSTRACT

A gas flow rate meter includes an upstream line and two chambers having substantially equal, fixed volumes. An adjustable valve may direct the gas flow through the upstream line to either of the two chambers. A pressure monitoring device may be configured to prompt valve adjustments, directing the gas flow to an alternate chamber each time a pre-set pressure in the upstream line is reached. A method of measuring the gas flow rate measures the time required for the pressure in the upstream line to reach the pre-set pressure. The volume of the chamber and upstream line are known and fixed, thus the time required for the increase in pressure may be used to determine the flow rate of the gas. Another method of measuring the gas flow rate uses two pressure measurements of a fixed volume, taken at different times, to determine the flow rate of the gas.

32 Claims, 4 Drawing Sheets

GAS FLOW METER AND METHOD FOR MEASURING GAS FLOW RATE

GOVERNMENT RIGHTS

The United States Government has rights in the following invention pursuant to Contract No. DE-AC07-99ID13727 between the U.S. Department of Energy and Bechtel BWXT Idaho, LLC.

BACKGROUND OF THE INVENTION

1. Field of the Invention

The present invention relates to a flow meter for measuring flow rate of a gas. More particularly, the present invention relates to an apparatus and method in which the time required to pressurize a chamber with a gas is used to determine the flow rate.

2. State of the Art

A thermal flow sensor is one example of a device used to determine the flow rate of a fluid. The mass flow rate of a fluid is known to be proportional to the amount of heat required to elevate the fluid temperature by a fixed amount as it flows through a laminar flow channel. A heating device and a temperature detector that reacts to the temperature of the heating device are used. The cooling effect on the flow sensor caused by the inflowing fluid is used to determine the flow rate. The greater the velocity of the flow and, consequently, the flow rate of the fluid, the greater the quantity of heat that is taken away from the flow sensor by the fluid per unit of time through heat transfer and convection. Thus, if a constant heating power is supplied to the heating device, the temperature detected by the temperature detector is lower in the case of a high flow rate than in the case of a low flow rate. Accordingly, if the heating power is regulated in such a way that the flow sensor is at a constant temperature, a higher heating power is required in the case of a greater flow rate than in the case of a lesser flow rate.

Calibration is required in order to permit measurement of absolute flow quantities with such a flow sensor. This requires taking into account substantial contributing factors in the determination of heat dissipation capacity, such as effects of the geometry of the flow sensor and the material properties of the fluid. Therefore, accurate use of such a thermal flow sensor requires that the composition of the fluid, the flow rate of which is to be determined, must not vary or must vary only within very narrow limits. Further, the composition of the fluid must be known, and the thermal flow sensor must be calibrated each time the flow rate of a fluid having a different composition is to be determined.

The "rate of pressure rise" or "rate of rise" method may be used to obtain accurate measurements of gas flow rate. Gas flow rate is a measure of the volume of gas that passes a point in an industrial system during a given period of time. Using the ideal gas law, the flow rate may be calculated from the measured values of the rate of change in temperature and pressure of a gas in a chamber of known volume.

This method has been used to test accuracy and calibrate a mass flow controller. A gas flow is conducted through a device under test, such as a mass flow meter, into an evacuated, volume-calibrated chamber for a measured interval of time. The changes in pressure and temperature of the gas in the chamber during the measured interval of time. The gas flow rate can then be calculated from the change in pressure over time and the change in temperature over time in the known volume. The "rate of rise" method requires multiple measurement devices in the gas flow line, and additional hardware, such as cables, connectors and analog/digital converters, increasing the complexity, size, and expense of a gas flow measurement system. Additionally, the flow of gas through the system is interrupted when the flow is diverted to the volume-calibrated chamber.

In view of the above-enumerated deficiencies in the state of the art with respect to mass flow meters, it would be desirable to develop a gas flow meter that does not require separate calibration for each gas or gas mixture and maintained the flow through the system. A flow meter that gives accurate values for low flow rates of mixed-composition gas, as well as pure gas systems, would also be desirable.

BRIEF SUMMARY OF THE INVENTION

The present invention includes a method and apparatus for measuring a gas flow rate. The flow rate may be determined independently of the composition of the gas mixture.

In accordance with one aspect of the present invention, a flow meter includes an upstream line and two chambers having substantially equal volumes. A four-way valve permits fluid communication between the upstream line and one of the two chambers. The four-way valve is configured such that the contents of the chamber not in fluid communication with the upstream line may be exhausted from the flow meter through an exhaust line via the four-way valve. A pressure monitoring device may be used to register the pressure of the upstream line. A timing device in communication with the pressure monitoring device may be used to measure the time required for the pressure in the upstream line to reach a pre-set pressure. If the pre-set pressure is reached, the four-way valve, also in communication with the pressure monitoring device, is configured to adjust and permit fluid communication between the upstream line and the exhausted chamber. The four-way valve thus adjusted, the chamber previously in fluid communication with the upstream line may now be in fluid communication with the exhaust line.

Another embodiment of the flow meter of the present invention includes two valves. An inlet valve permits fluid communication between an upstream line and a first chamber, and an outlet valve blocks egress from the first chamber. The outlet valve thus adjusted places a second chamber in fluid communication with an exhaust line. The inlet valve and outlet valve are each adjustable, such that the second chamber may be in fluid communication with upstream line and the egress blocked. The first chamber may concurrently be in fluid communication with the exhaust line. A pressure monitoring means registers the pressure of the upstream line, and prompts adjustments to the valve when a pre-set pressure of the upstream line is reached.

One embodiment of a method for measuring the flow rate of a gas according to the present invention uses the time period, or "trip" time, required for the pressure in an upstream line to reach a pre-set "trip" pressure. The volume and temperature of the upstream line and a first chamber are constant and known, and the initial pressure of the upstream line and the first chamber are known. Therefore, the initial number of moles of gas within the upstream line and first chamber are known. As the flow of gas to be measured enters the upstream line and the first chamber in fluid communication therewith, the pressure in the upstream line increases. When the pressure reaches the pre-set "trip" pressure, the number of moles of gas within the upstream line and first chamber at this "trip" time and "trip" pressure are known. The increase in the number of moles may be converted to determine the increase in the volume of gas at standard conditions. This increase in the volume of gas and the "trip" time allow determination of the flow rate of the gas.

The valve may be adjusted to exhaust the gas from the first chamber and to establish fluid communication between the upstream line and a second chamber having substantially the same volume as the first chamber. Thus, one chamber may be filled with the gas from an upstream line, while another chamber may be relieved of the gas through an exhaust line, maintaining the flow of the gas through the system. The time required for the upstream line to reach the "trip" pressure in each cycle may repeatedly be used to determine the flow rate of the gas.

Another embodiment of a method for measuring the flow rate of a gas according to the present invention uses two pressure measurements of an upstream line in fluid communication with a chamber, taken at different times, to determine the flow rate of the gas. The two pressure measurements may be used to determine the increase in pressure and this increase, along with the time between the measurements, and the constant, known temperature and volume of the upstream line and chamber may be used to determine the flow rate of the gas. Dual chambers may be used to maintain the flow of the gas through the system, as one chamber may be filled with the gas from an upstream line while another chamber may be relieved of the gas through an exhaust line.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Many gas delivery systems employ gases that behave substantially as ideal gases. In other words, their behavior can be accurately predicted by and modeled in accordance with the ideal gas law. The relationship between pressure change and mass, i.e., the number of moles of a substantially ideal gas in a fixed volume and at a fixed temperature over time is constant regardless of the gas. The change in the number of moles of a gas in a fixed volume may, therefore, be determined by measuring the pressure change if the fixed volume and fixed temperature are known. When the ideal gas law applies, a mole of any gas occupies the same volume under the same conditions of temperature and pressure. Thus, the flow rate of the gas at standard conditions may be determined by the change in the number of moles over the time. In those situations in which gases behave somewhat differently from an ideal gas, simple correction factors can be used to render the measurement of pressure and temperature changes over time more accurate.

Figure 1:
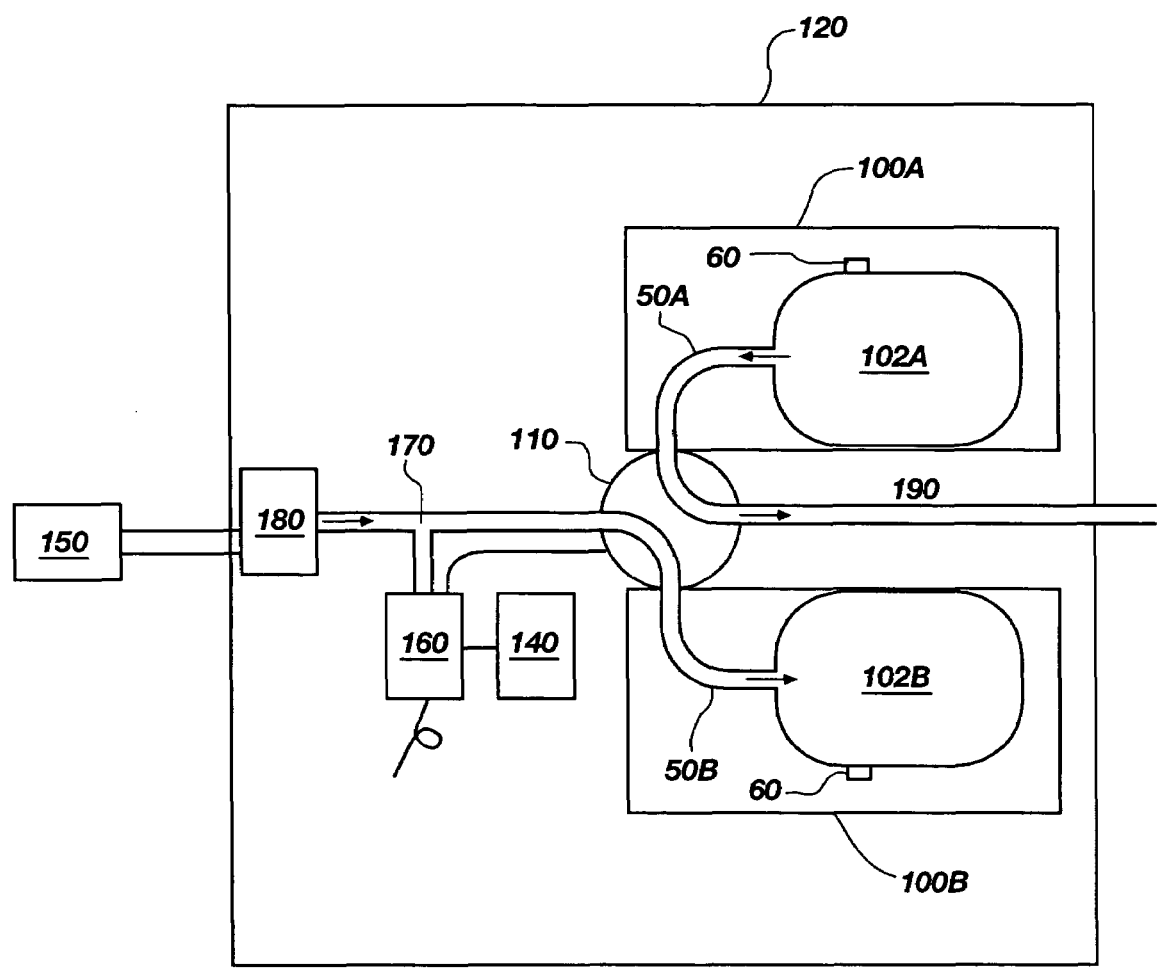
FIG. 1 is a schematic diagram of a device for measuring flow rate.

One exemplary embodiment of a flow meter 120 according to the present invention is depicted in FIG. 1. A source 150 of a gas is provided in a fluid delivery system with the flow meter 120. A back pressure regulator 180 may optionally be included to maintain the source pressure, the pressure of the gas toward the source 150 from the flow meter 120, at a substantially constant pressure. A pressure monitoring device, such as a pressure transducer 160, is in fluid communication with an upstream line 170 of the flow meter 120 to provide a pressure reading of the gas in the upstream line 170. A four-way valve 110 is adjustable and may establish fluid communication between the upstream line 170 and either a first chamber 100A or a second chamber 100B. The first chamber 100A includes a first container 102A and an associated inlet line 50A. The second chamber 100B includes a second container 102B and an associated inlet line 50B. The first container 102A and the second container 102B preferably are of an equal volume. Alternatively, the length of the inlet lines 50A and 50B may be adjusted to create equal volumes within the first chamber 100A and the second chamber 100B. The first and second containers 102A and 102B may, for example, be shaped as a cylinder, a sphere, a cylinder having spherical end caps, or any shape capable of containing a gas at a pre-set "trip" pressure. The pre-set "trip" pressure is preferably less than 50 psig. At pressures grater than 50 psig the gas may cease to behave as an ideal gas.

FIG. 1 depicts four-way valve 110 adjusted to cause the second chamber 100B to be in fluid communication with the upstream line 170. The pressure monitoring device may be in communication with the four-way valve 110, and when the pre-set "trip" pressure is registered by pressure transducer 160, the four-way valve 110 may adjust to change the fluid communication from the second chamber 100B and the upstream line 170 to the first chamber 100A and the upstream line 170. Timing device 140, in communication with pressure transducer 160, measures a "trip" time, the time period required to reach the pre-set "trip" pressure. The "trip" time is also the time period between the four-way valve 110 adjustments, changing the fluid communication of the upstream line 170 from one chamber to the other.

The four-way valve 110 may be configured to cause the first chamber 100A to be in fluid communication with the exhaust line 190 if the second chamber 100B is in fluid communication with the upstream line 170. Thus, any gas contained in first chamber 100A may be exhausted, and the pressure in the first chamber 100A may equalize with the pressure of the exhaust line 190, typically 0 psig, that is, atmospheric pressure.

A flow meter, including chambers 100A and 100B having a volume of greater magnitude, may be useful to measure a flow rate of greater magnitude. Alternatively, to measure a flow rate of lesser magnitude, a flow meter including chambers 100A and 100B having a volume of lesser magnitude may be helpful. Another configuration of the flow meter to measure a flow rate of greater magnitude is a flow meter having a pre-set "trip" pressure of greater magnitude. Similarly, the flow meter may be configured to have a pre-set "trip" pressure of lesser magnitude to measure a flow rate of lesser magnitude. Thus, a flow meter may be configured so the trip time may be a time period that timing device 140 may accurately measure.

The pressure transducer 160 may be any high-accuracy pressure gauge that converts pressure into an electrical signal. Various types of pressure transducers may be employed; one is the strain-gauge based transducer. The conversion of pressure into an electrical signal is achieved by the physical deformation of strain gauges that are bonded into the diaphragm of the pressure transducer and wired into a Wheatstone bridge configuration. Pressure applied to the pressure transducer produces a deflection of the diaphragm, which introduces strain to the gauges. The strain will produce an electrical resistance change proportional to the pressure. Another type of pressure transducer that may be used is a capacitance manometer. In this device, a capacitance sensor measures the change in electrical capacitance that results from the movement of a diaphragm relative to some fixed capacitance electrodes. In some designs, the diaphragm is allowed to move. In others, a variable DC voltage is applied to keep the sensor's Wheatstone bridge in a balanced condition. The amount of voltage required is directly related to the pressure. A piezoelectric pressure transducer may alternatively be used. One type of piezoelectric pressure transducer employs a quartz crystal sensing element and a diaphragm for transferring the pressure to the element. When pressure is applied to the quartz crystal, a charge is developed across the crystal that is proportional to the force applied. The movement of the diaphragm of the strain-gauge based transducer, the capacitance manometer or of the piezoelectric pressure transducer in response to changes in pressure is relatively small and, therefore, does not significantly affect the volume within the upstream line 170.

The gas may be a pure gas, or a mixed-composition gas. The gas flow rate is independent of the gas composition because the number of moles of a substantially ideal gas in a fixed volume and at a fixed temperature over time is constant regardless of the gas. Therefore, the flow meter may be used to measure the flow rate a gas having a constantly changing composition.

Figure 2:
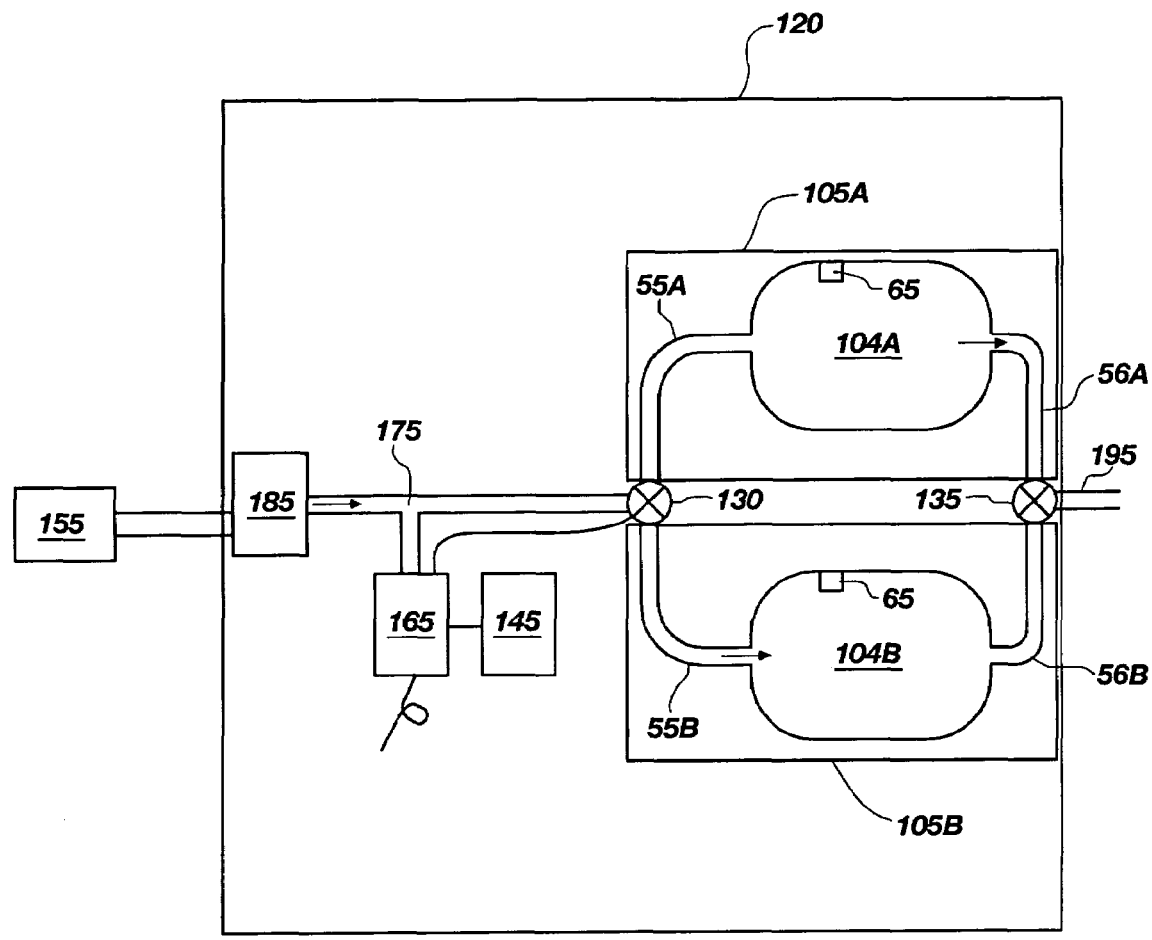
FIG. 2 is a schematic diagram of another device for measuring flow rate.

Another embodiment of a flow meter 125 is depicted in FIG. 2. A source 155 of a gas is provided in a fluid delivery system with the flow meter 125. A back pressure regulator 185 may optionally be included to maintain the source pressure, the pressure of the gas toward the source 155 from the flow meter 125, at a substantially constant pressure. A pressure monitoring device, such as a pressure transducer 165, is in fluid communication with the upstream line 175 of the flow meter 125 to provide a pressure reading of the gas in the upstream line 175. An upstream valve 130 establishes fluid communication between the upstream line 175 and either chamber 105A or chamber 105B. The first chamber 105A includes a first container 104A and an associated inlet line 55A and outlet line 56A. The second chamber 105B includes a second container 104B and an associated inlet line 55B and outlet line 56B. The first container 104A and the second container 104B preferably are of an equal volume. Alternatively, the length of the inlet lines 55A and 55B and/or outlet lines 56A and 56B may be adjusted to create equal volumes within the first chamber 105A and the second chamber 105B downstream of the upstream valve 130.

If the upstream valve 130 is adjusted for establishing fluid communication between the upstream line 175 and the first chamber 105A, the second chamber 105B is blocked from fluid communication with the upstream line 175. The downstream valve 135 may be in communication with the upstream valve 130, and the two valves may be configured to adjust simultaneously. Fluid communication between the second chamber 105B and the exhaust line 195 is established through the downstream valve 135, and fluid communication between the first chamber 105A and exhaust line 195 blocked if the upstream valve 130 is adjusted for establishing fluid communication between the upstream line 175 and the first chamber 105A.

Timing device 145, in communication with pressure transducer 165 measures the "trip" time, the time period required to reach the pre-set "trip" pressure. The "trip" time is also the time period between adjustments to the upstream valve 130 and downstream valve 135 changing the fluid communication of the upstream line 175 and exhaust line 195 from one chamber to the other.

Figure 3:
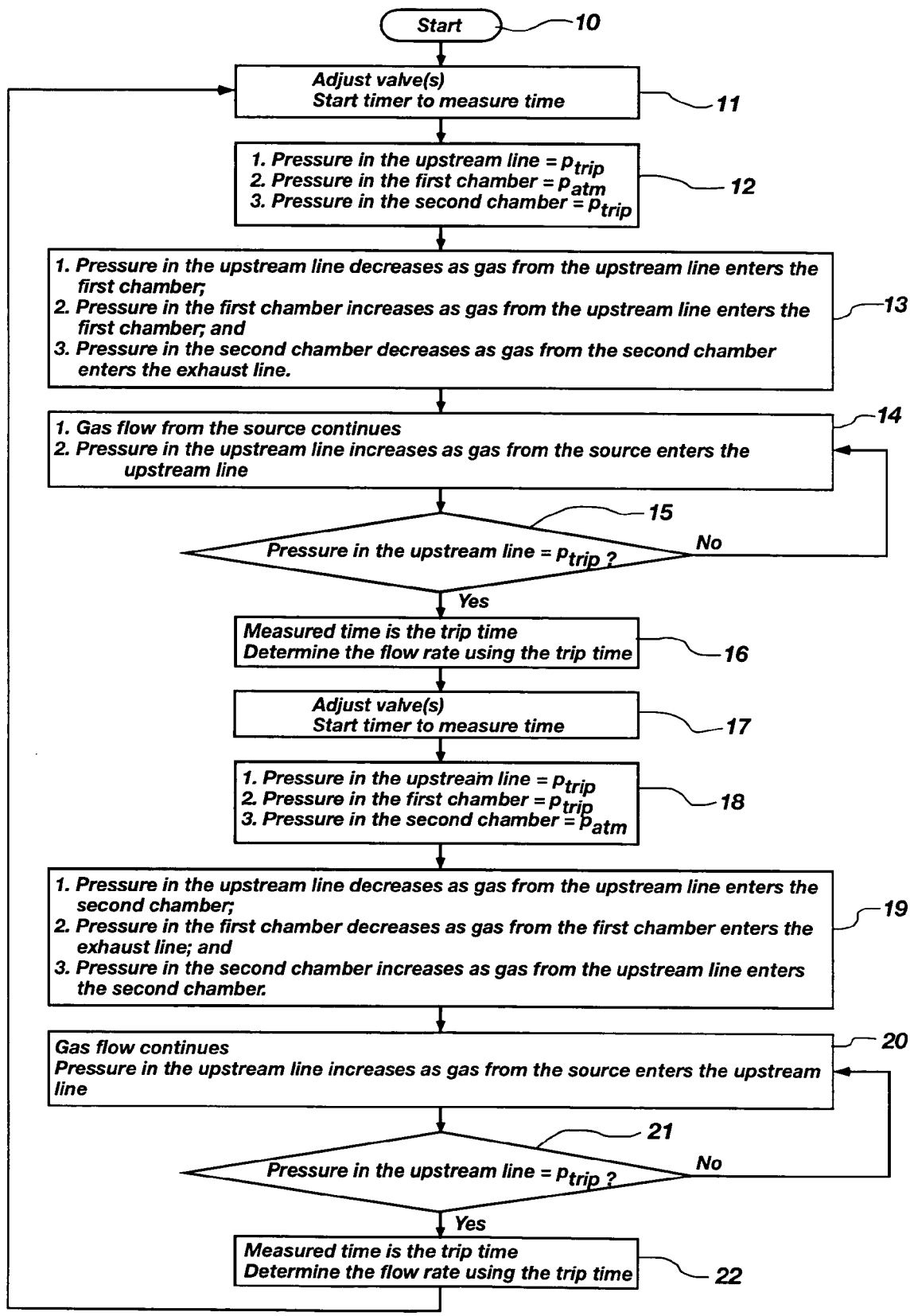
FIG. 3 is a flow chart of a method of determining flow rate of a gas.

One exemplary method of determining flow rate with a flow meter of the present invention uses the "trip" time, the time period required to pressurize a chamber of the flow meter to a pre-set "trip" pressure. The method is described referring to the flow meter 120 illustrated in FIG. 1, but may be applied using the flow meter 125 illustrated in FIG. 2. The flow rate may be determined in accordance with the flow diagram of FIG. 3. The method starts at act 10 assuming the flow meter has been through at least one cycle, so the initial pressures within the flow meter are proper for measurements. A cycle is measured as the filling and consequent relieving of a chamber. The determination of flow rate begins at act 11 by adjusting the four-way valve 110 to establish fluid communication between the upstream line 170 and the first chamber 100A. The second chamber 100B is now in fluid communication with the exhaust line. The ideal gas law is applied.

$$PV = nRT \qquad \text{Equation 1}$$

where:
P is the pressure of the gas in the chamber;
V is the volume of the chamber;
n is the mass of the gas in the chamber (number of moles);
R is the universal gas constant; and
T is the temperature of the gas in the chamber.

The system is first defined in act 12 at time t=0 ($t_0$), the moment the pressure in the upstream line 170 ($P_{up}$) equals the pre-set "trip" pressure and the pressure in the first chamber 100A ($P_{ch}$) is 0 psig or the atmospheric pressure, and the upstream pressure, the pressure in the second chamber 100B, equals the pre-set "trip" pressure ($P_{trip}$).

$$P_{up} = P_{trip}$$

$$P_{ch} = P_{atm} \qquad \text{Equations 2 and 3}$$

At time t=0 ($t_0$), the number of moles in the upstream line 170 ($n_{up}$) and in the first chamber 100A ($n_{ch}$) are:

$$n_{up} = \frac{P_{trip} V_{up}}{RT} \qquad \text{Equations 4 and 5}$$

$$n_{ch} = \frac{P_{atm} V_{ch}}{RT}$$

where $V_{up}$ is the volume of the upstream line 170 and $V_{ch}$ is the volume of the first chamber 100A.

Act 13 is effected as the gas flows between chambers and lines in fluid communication and the pressures between chambers and lines in fluid communication equalize. The pressure differential between the upstream line 170 and the first chamber 100A causes gas from the upstream line 170 to enter the first chamber 100A. Thus, the pressure in the upstream line 170 decreases, and the pressure in the first chamber 100A increases. The pressure in the second chamber 100B decreases as gas from the second chamber enters the exhaust line.

Gas from the source 150 continues to enter the upstream line 170 in act 14, increasing the pressure in the upstream line 170 and the first chamber 100A. In act 15, the pressure transducer 160 monitors the pressure in the upstream line 170 until the pre-set "trip" pressure, $P_{trip}$, is reached.

When the pre-set "trip" pressure is reached, the timing device 140 measures the "trip" time, act 16. The time is now t=trip ($t_{trip}$), and the pressure in the upstream line 170 and the first chamber 100A are equal.

$$P_{up} = P_{trip}$$

$$P_{ch} = P_{trip} \quad \text{Equations 6 and 7}$$

The number of moles at time t=trip ($t_{trip}$) in the upstream line 170 ($n_{up}$) and in the first chamber 100A ($n_{ch}$) are:

$$n_{up} = \frac{P_{trip} V_{up}}{RT}$$

$$n_{ch} = \frac{P_{trip} V_{ch}}{RT} \quad \text{Equations 8 and 9}$$

The total number of moles in the system, i.e., the upstream line 170 and the chamber in fluid communication therewith, at time t=0 is:

$$n_{tot} = n_{up} + n_{ch} = \frac{P_{trip} V_{up}}{RT} + \frac{P_{atm} V_{ch}}{RT} \quad \text{Equation 10}$$

The total number of moles in the system at time t=trip is:

$$n_{tot} = n_{up} + n_{ch} = \frac{P_{trip} V_{up}}{RT} + \frac{P_{atm} V_{ch}}{RT} \quad \text{Equation 11}$$

The change in the total number of moles in the system between trip times is therefore:

$$\Delta n_{tot} = \quad \text{Equation 12}$$
$$n_{tot} - n_{tot} = \left[\frac{P_{trip} V_{up}}{RT} + \frac{P_{trip} V_{ch}}{RT}\right] - \left[\frac{P_{trip} V_{up}}{RT} + \frac{P_{atm} V_{ch}}{RT}\right]$$

This equation reduces to:

$$\Delta n_{tot} = \frac{(P_{trip} P_{atm}) V_{ch}}{RT} \quad \text{Equation 13}$$

The ideal gas law may be used to convert the change in the total number of moles in the system between "trip" times to the volume of gas produced between trip times at standard conditions. The standard conditions are usually defined as an "absolute" temperature of 273.15K and an "absolute" pressure of 1 atmosphere.

$$V_{sc} = \Delta n_{tot} R\left(\frac{T_{sc}}{P_{sc}}\right) = \quad \text{Equation 14}$$
$$\frac{(P_{trip} - P_{atm}) V_{ch}}{RT} \times R\left(\frac{T_{sc}}{P_{sc}}\right) = \frac{P_{trip} - P_{atm}}{P_{sc}} \times \frac{T_{sc}}{T} \times V_{ch}$$

The flow rate (q) at standard units is the volume of gas at standard conditions produced divided by the time between trips:

$$q = \frac{V_{sc}}{t_{trip}} \quad \text{Equation 15}$$

Thus, the measurement of the time required to pressurize a chamber, $t_{trip}$, may be used to compute the flow rate (q). The cycle is completed as the four-way valve 110 adjusts in act 17 and the first chamber 100A is relieved of the gas contained therein through the exhaust line 190 and the second chamber 100B is filled with the gas from the source 150 through fluid communication with upstream line 170. Acts 18 through 22 mimic acts 12 through 16 to measure the "trip" time and again determine the flow rate of the gas as the second chamber 100B is pressurized.

The described method of determining the flow rate of a gas may be executed using a flow meter 125 as illustrated in FIG. 2. In acts 11 and 17, an upstream valve 130 and an downstream valve 135 may concurrently adjust, changing the fluid communication. The gas flow may enter a first chamber through upstream valve 130, the first chamber having been previously relieved through an exhaust line 190 via the downstream valve 135. A second chamber initially in fluid communication with the upstream line 170 through upstream valve 130 will be in fluid communication with the exhaust line through downstream valve 135.

Figure 4:
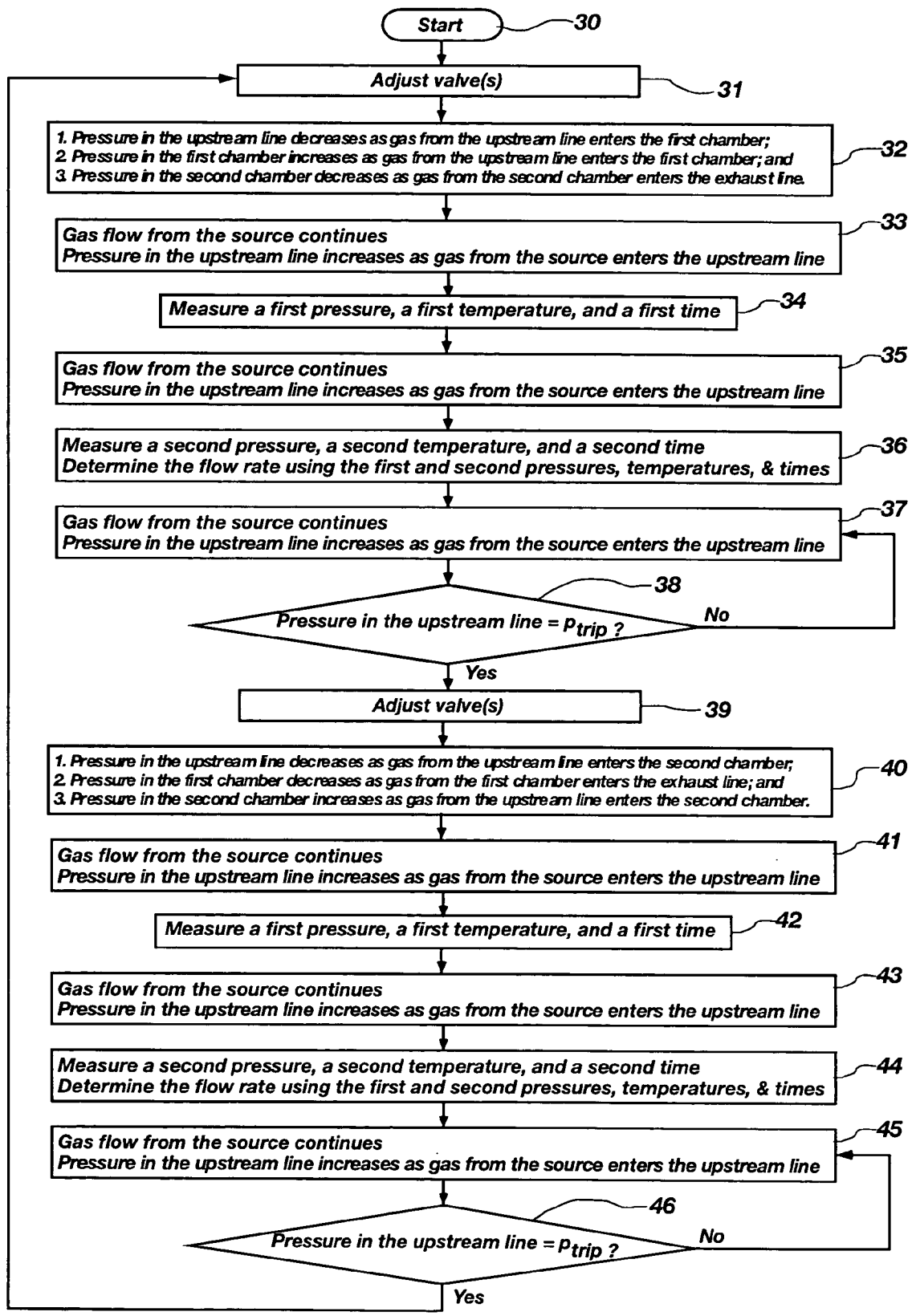
FIG. 4 is a flow chart of another method of determining flow rate of a gas.

Another embodiment of a method of determining flow rate is based on the rate of pressure increase within a fixed volume, for example, an upstream line 170 and a first chamber 100A. The flow rate is determined using the ideal gas law and the pressures measured at different times regardless of the "trip" time and "trip" pressure. Following the flow chart of FIG. 4, the method starts at act 30 assuming the flow meter has been through at least one cycle, so the initial pressures within the flow meter are proper for measurements. A cycle begins at act 31 by adjusting the four-way valve 110 to establish fluid communication between the upstream line 170 and the first chamber 100A. The second chamber 100B is now in fluid communication with the exhaust line. The gas flows between the chambers and lines in fluid communication in act 32 and the pressures between chambers and lines in fluid communication equalize. The gas flow entering the upstream line 170 from a source 150, continuous throughout the cycle, causes the pressure in the upstream line 170 to increase, act 33. A first pressure and a first time measurement are taken in act 34, the gas flow continues in act 35, and then, in act 36, a second pressure and a second time measurement are taken. The flow rate may now be determined. First, the total number of moles in the system, i.e., the upstream line 170 and the chamber in fluid communication therewith, at time t=1 and t=2, is determined, based on the first and second pressure measurements.

$$n_{tot} = \frac{P V_{tot}}{RT} \quad \text{Equations 16 and 17}$$
$$V_{tot} = V_{up} + V_{ch}$$

where $V_{tot}$ is the total volume of the upstream line 170 and the first chamber 100A.

$$n_{tot1} = \frac{P_1 V_{tot}}{RT} \quad \text{Equations 18 and 19}$$

-continued $$n_{tot2} = \frac{P_2 V_{tot}}{RT}$$

The change in the number of moles from time t=1 and time t=2 is found by subtracting the number of moles at time t=1 from the number of moles at time t=2.

$$\Delta n_{tot} = n_{tot2} - n_{tot1} = (P_2 - P_1)\frac{V_{tot}}{RT} \quad \text{Equation 20}$$

The change in the number of moles may then be converted to the volume of gas produced between time t=1 and time t=2 at standard conditions:

$$V_{sc} = \Delta n_{tot} R\left(\frac{T_{sc}}{P_{sc}}\right) = \quad \text{Equation 21}$$

$$\frac{(P_2 - P_1)V_{tot}}{RT} \times R\left(\frac{T_{sc}}{P_{sc}}\right) = \frac{P_2 - P_1}{P_{sc}} \times \frac{T_{sc}}{T} \times V_{tot}$$

where pressures and temperatures are absolute.

The flow rate at standard units is the volume of gas at standard conditions produced between $t_1$ and $t_2$ divided by the change in time:

$$q = \frac{V_{sc}}{t_2 - t_1} \quad \text{Equation 22}$$

where q is in standard volume per time, such as scf/D (standard cubic feet of gas daily) and $V_{sc}$ is calculated as shown.

The cycle continues after the flow rate is determined. In act 37, the gas continues to enter the upstream line 170 until the pressure in the upstream line equals the pre-set "trip" pressure, determined in act 38. The four-way valve 110 may then be adjusted in act 39, placing the second chamber 100B in fluid communication with the upstream line 170. Acts 40 through 46 follow acts 32 through 38, and the flow rate of the gas may be determined using two pressure measurements as the gas enters the upstream line 170 and second chamber 100B.

While the present invention has been described herein with respect to certain preferred embodiments, those of ordinary skill in the art will recognize and appreciate that it is not so limited. Rather, many additions, deletions and modifications to the preferred embodiments may be made without departing from the scope of the invention as hereinafter claimed. In addition, features from one embodiment may be combined with features of another embodiment while still being encompassed within the scope of the invention. Therefore, the invention is to encompass all modifications, equivalents, and alternatives falling within the spirit and scope of the invention as defined by the following appended claims.

What is claimed is:

1. An apparatus for measuring a flow rate of a gas, comprising:
   an upstream line having a fixed volume;
   a sensor in fluid communication with the upstream line and configured for measuring pressure;
   a valve in fluid communication with the upstream line, located downstream of the sensor;
   a first chamber located downstream of the valve and having a first chamber volume;
   a second chamber located downstream of the valve and having a second chamber volume, the valve being adjustable to allow fluid communication between the upstream line and either the first chamber or the second chamber, the second chamber volume being substantially equal to the first chamber volume;
   an exhaust line; and
   structure for placing the exhaust line alternately in communication with the first chamber and the second chamber.

2. The apparatus of claim 1, further comprising a back pressure regulator in fluid communication with the upstream line, located at an upstream distal end of the upstream line.

3. The apparatus of claim 1, wherein the sensor comprises a pressure transducer.

4. The apparatus of claim 3, wherein the pressure transducer comprises a strain gauge-based transducer.

5. The apparatus of claim 3, wherein the pressure transducer comprises a capacitance manometer.

6. The apparatus of claim 1, wherein the valve comprises a four-way valve.

7. The apparatus of claim 6, wherein the exhaust line is positioned downstream of the four-way valve.

8. The apparatus of claim 7, wherein the four-way valve is further adjustable to allow fluid communication between the exhaust line and either the first chamber or the second chamber, each chamber being in fluid communication with either the upstream line or the exhaust line at any given time.

9. The apparatus of claim 3, further comprising a timing device connected to the pressure transducer.

10. The apparatus of claim 1, wherein the first chamber and the second chamber each comprise a substantially cylindrical container and an associated inlet line.

11. The apparatus of claim 1, wherein the first chamber comprises:
   a substantially cylindrical first chamber container;
   a first chamber inlet line in fluid communication with the substantially cylindrical first chamber container; and
   a first chamber outlet line in fluid communication with the substantially cylindrical first chamber container; and
   the second chamber comprises:
   a substantially cylindrical second chamber container;
   a second chamber inlet line in fluid communication with the substantially cylindrical second chamber container; and
   a second chamber outlet line in fluid communication with the substantially cylindrical second chamber container.

12. The apparatus of claim 11, further comprising a downstream valve operably connected with the first chamber outlet line and the second chamber outlet line.

13. The apparatus of claim 12, wherein the exhaust line is positioned downstream of the downstream valve.

14. The apparatus of claim 1, wherein the first chamber volume comprises a fixed volume.

15. A method for measuring a gas flow rate, comprising:
   introducing a flow of a gas into an upstream line;
   introducing the flow of the gas from the upstream line through a valve into a first chamber having a fixed volume;
   measuring the pressure of the gas in the upstream line until a pre-set pressure has been reached;
   measuring a time period required to reach the pre-set pressure;

determining the gas flow rate using the time period required to reach the pre-set pressure;

adjusting the valve to introduce the flow of the gas from the upstream line through the valve into a second chamber having substantially the fixed volume; and exhausting the gas from the first chamber to an exhaust line.

16. The method of claim 15, further comprising maintaining a substantially constant source pressure upstream of the upstream line.

17. The method of claim 15, wherein introducing the flow of the gas comprises introducing a flow of a mixed-composition gas.

18. The method of claim 15, wherein determining the gas flow rate comprises determining the gas flow rate independently of the gas composition.

19. The method of claim 15, further comprising maintaining a substantially constant temperature of the gas.

20. The method of claim 15, wherein determining the gas flow rate includes determining a volume of gas produced at standard conditions according to the following mathematical relationship:

$$V_{sc} = \frac{P_{trip} - P_{atm}}{P_{sc}} \times \frac{T_{sc}}{T} \times V_{ch}$$

21. The method of claim 20, wherein determining the gas flow rate is executed according to the following mathematical relationship:

$$q = \frac{V_{sc}}{t_{trip}}.$$

22. The method of claim 15, wherein exhausting the gas from the first chamber is effected by the gas from the first chamber passing through the valve to an exhaust line.

23. The method of claim 15, wherein exhausting the gas from the first chamber is effected by the gas from the first chamber passing through a downstream valve to an exhaust line.

24. A method for measuring a gas flow rate, comprising:
introducing a flow of a gas into an upstream line;
introducing the gas from the upstream line through a valve into a first chamber;
measuring a first pressure in the upstream line at a first time;
measuring a second pressure in the upstream line at a second time;
determining the gas flow rate independently of a composition of the gas, using the first and second pressure and the first and second time;
introducing the gas from the upstream line through the valve into a second chamber; and
exhausting a pressurized gas from the first chamber.

25. The method of claim 24, further comprising maintaining a substantially constant source pressure upstream of the upstream line.

26. The method of claim 24, wherein introducing the flow of the gas comprises introducing a flow of a mixed-composition gas.

27. The method of claim 24, wherein determining the gas flow rate comprises determining the gas flow rate independently of the composition of the gas.

28. The method of claim 24, further comprising maintaining a substantially constant temperature of the gas.

29. The method of claim 24, wherein determining the gas flow rate includes determining a volume of gas produced at standard conditions according to the following mathematical relationship:

$$V_{sc} = \frac{P_2 - P_1}{P_{sc}} \times \frac{Tsc}{T} \times V_{tot}.$$

30. The method of claim 29, wherein determining the gas flow rate is executed according to the following mathematical relationship:

$$q = \frac{V_{sc}}{t_2 - t_1}.$$

31. The method of claim 24, wherein exhausting the pressurized gas is effected by the pressurized gas passing through the valve to an exhaust line.

32. The method of claim 24, wherein exhausting the pressurized gas is effected by the pressurized gas passing through a downstream valve to an exhaust line.

\* \* \* \* \*